(12) United States Patent
Aurongzeb et al.

(10) Patent No.: US 11,599,170 B2
(45) Date of Patent: Mar. 7, 2023

(54) MANAGEMENT OF A THERMALLY REGULATED STRUCTURE OF AN INFORMATION HANDLING SYSTEM

(71) Applicant: Dell Products L.P., Round Rock, TX (US)

(72) Inventors: Deeder M. Aurongzeb, Austin, TX (US); Weijong Sheu, Austin, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 16/889,366

(22) Filed: Jun. 1, 2020

(65) Prior Publication Data
US 2021/0373626 A1 Dec. 2, 2021

(51) Int. Cl.
G05B 15/02 (2006.01)
G06F 1/20 (2006.01)
(Continued)

(52) U.S. Cl.
CPC ............... *G06F 1/206* (2013.01); *B32B 3/28* (2013.01); *B32B 5/026* (2013.01); *B32B 5/12* (2013.01);
(Continued)

(58) Field of Classification Search
None
See application file for complete search history.

(56) References Cited

U.S. PATENT DOCUMENTS

| | | | |
|---|---|---|---|
| 5,771,873 A * | 6/1998 | Potter ..................... | F01L 3/04 |
| | | | 123/668 |
| 7,800,898 B2 * | 9/2010 | Shuy .................. | H05K 7/20009 |
| | | | 361/679.52 |

(Continued)

OTHER PUBLICATIONS

Anja Lund et al., "Energy harvesting textiles for a rainy day: woven piezoelectrics based on melt-spun PVDF microfibres with a conducting core", npj Flexible electronics (2018) 9, Published Mar. 22, 2018.

(Continued)

Primary Examiner — Jason Lin
(74) Attorney, Agent, or Firm — McDermott Will & Emery LLP (57) ABSTRACT

An information handling system, comprising: a voltage source; a thermally regulated structure, including: a thermal fabric layer, the thermal fabric layer having a porosity; a laminate layer coupled to the thermal fabric layer, wherein a shape of the laminate layer controls the porosity of the thermal fabric layer; a temperature sensor configured to detect a first temperature of the information handling system; a thermal management controller to perform operations comprising: determining that the first temperature is above a threshold; in response, calculating a voltage to apply to the thermally regulated structure based on the first temperature; and providing a command to the voltage source to apply the voltage to the laminate layer of the thermally regulated structure to adjust a shape of the laminate layer such the porosity of the thermal fabric provides an emissivity of the thermally regulated structure to thermally radiate heat from the thermally regulated structure.

15 Claims, 6 Drawing Sheets

(51) Int. Cl.
  *B32B 7/025* (2019.01)
  *B32B 5/02* (2006.01)
  *B32B 5/12* (2006.01)
  *B32B 3/28* (2006.01)
  *B32B 7/027* (2019.01)
  *B32B 5/26* (2006.01)
(52) U.S. Cl.
  CPC .............. *B32B 5/266* (2021.05); *B32B 7/025* (2019.01); *B32B 7/027* (2019.01); *G05B 15/02* (2013.01); *B32B 2262/106* (2013.01); *B32B 2307/20* (2013.01); *B32B 2307/30* (2013.01); *B32B 2457/20* (2013.01)

(56) References Cited

U.S. PATENT DOCUMENTS

| | | | | |
|---|---|---|---|---|
| 7,829,162 | B2* | 11/2010 | Eskra | B41M 5/385 |
| | | | | 428/32.8 |
| 8,951,654 | B2* | 2/2015 | Sachdev | H01M 50/409 |
| | | | | 429/129 |
| 11,433,637 | B2* | 9/2022 | Suzuki | C23C 28/046 |
| 2003/0129379 | A1* | 7/2003 | Yao | H01M 50/494 |
| | | | | 428/315.7 |
| 2005/0260434 | A1* | 11/2005 | Nelson | C23C 4/18 |
| | | | | 427/446 |
| 2006/0000569 | A1* | 1/2006 | Kron | D21H 21/22 |
| | | | | 162/123 |
| 2010/0051220 | A1* | 3/2010 | Hong | D21H 21/54 |
| | | | | 162/164.7 |
| 2010/0303520 | A1* | 12/2010 | Miyauchi | C08L 77/00 |
| | | | | 521/64 |
| 2013/0209682 | A1* | 8/2013 | Massingill, Jr. | C09D 7/67 |
| | | | | 524/588 |
| 2016/0264479 | A1* | 9/2016 | Tomita | C04B 38/00 |
| 2016/0305037 | A1* | 10/2016 | Tateno | C25D 11/24 |
| 2017/0292027 | A1* | 10/2017 | Chen | C09D 5/24 |
| 2019/0001644 | A1* | 1/2019 | Nukada | B32B 3/26 |

OTHER PUBLICATIONS

Thermal Properties of Piezoceramic Material by noliac at <http://www.noliac.com/tutorials/piezo-basics/thermal-properties-of-piezoceramic-material/>, printed Jun. 1, 2020, 4 pages.

* cited by examiner

MANAGEMENT OF A THERMALLY REGULATED STRUCTURE OF AN INFORMATION HANDLING SYSTEM

BACKGROUND

Field of the Disclosure

The disclosure relates generally to information handling systems, and specifically, controlling a thermally regulated structure of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can have inhomogeneous temperature distribution that can negatively affect performance of the information handling system.

SUMMARY

Innovative aspects of the subject matter described in this specification may be embodied in an information handling system, comprising: a voltage source; a thermally regulated structure, including: a thermal fabric layer, the thermal fabric layer having a porosity; a laminate layer coupled to the thermal fabric layer, wherein a shape of the laminate layer controls the porosity of the thermal fabric layer; a temperature sensor configured to detect a first temperature at a particular location of the information handling system associated with the thermally regulated structure; a memory media storing instructions; a thermal management controller in communication with the memory media to execute the instructions to perform operations comprising: determining that the first temperature is above a threshold; in response to determining that the first temperature is above the threshold, calculating a voltage to apply to the thermally regulated structure based on the first temperature; and providing a command to the voltage source to apply the voltage to the laminate layer of the thermally regulated structure to adjust a shape of the laminate layer such the porosity of the thermal fabric provides an emissivity of the thermally regulated structure to thermally radiate heat from the thermally regulated structure.

Other embodiments of these aspects include corresponding methods, apparatus, and computer programs, configured to perform the actions of the methods, encoded on computer storage devices.

These and other embodiments may each optionally include one or more of the following features. For instance, the thermally regulated structure further includes a knitted layer and an interface layer, the interface layer positioned between the knitted layer and the laminate layer. The information handling system includes a first body and a second body, the first body coupled to the second body by a hinging apparatus, the first body including a first surface and a second surface positioned opposite to the first surface, the second surface of the first body including a display, wherein the thermally regulated structure is positioned on the first surface of the first body. Further comprising: an additional thermally regulated structure, including: an additional thermal fabric layer, the thermal fabric layer having a porosity; an additional laminate layer coupled to the additional thermal fabric layer, wherein a shape of the additional laminate layer controls the porosity of the additional thermal fabric layer; and an additional temperature sensor configured to detect an additional temperature at a particular location of the information handling system associated with the additional thermally regulated structure. The thermal management controller is further configured to: determine that the additional temperature is above an additional threshold; in response to determining that the additional temperature is above the additional threshold, calculating an additional voltage to apply to the additional thermally regulated structure based on the additional temperature; and providing an additional command to the voltage source to apply the additional voltage to the laminate layer of the additional thermally regulated structure to adjust a shape of the additional laminate layer such the porosity of the additional thermal fabric layer provides an emissivity of the additional thermally regulated structure to thermally radiate heat from the additional thermally regulated structure. The second body includes a third surface and a fourth surface positioned opposite to the third surface, the third surface including an additional display, wherein the additional thermally regulated structure is positioned on the fourth surface of the second body. The thermal fabric layer includes a carbon nanotube-based fabric.

Innovative aspects of the subject matter described in this specification may be embodied in a method of controlling a thermally regulated structure of an information handling system, including: detecting a first temperature at a particular location of the information handling system associated with the thermally regulated structure, the thermally regulated structure including i) a thermal fabric layer having a porosity and ii) a laminate layer coupled to the thermal fabric layer having a shape that controls the porosity of the thermal fabric layer; determining that the first temperature is above a threshold; in response to determining that the first temperature is above the threshold: calculating a voltage to apply to the thermally regulated structure based on the first temperature; and providing a command to a voltage source to apply the voltage to the laminate layer of the thermally regulated structure to adjust a shape of the laminate layer such the porosity of the thermal fabric layer provides an emissivity of the thermally regulated structure to thermally radiate heat from the thermally regulated structure.

Other embodiments of these aspects include corresponding system, apparatus, and computer programs, configured to perform the actions of the methods, encoded on computer storage devices.

These and other embodiments may each optionally include one or more of the following features. For instance, detecting the first temperature at the particular location of the thermally regulated structure further includes detecting the first temperature at the particular portion of the thermally regulated structure positioned on a first surface of a first body of the information handling system, the first surface positioned opposite to a second surface that includes a display. Detecting an additional temperature at a particular location of the information handling system associated with an additional thermally regulated structure, the additional thermally regulated structure including i) an additional thermal fabric layer having a porosity and ii) an additional laminate layer coupled to the additional thermal fabric layer having a shape that controls the porosity of the additional thermal fabric layer; determining that the additional temperature is above an additional threshold; in response to determining that the additional temperature is above the additional threshold: calculating an additional voltage to apply to the additional thermally regulated structure based on the additional temperature; and providing a command to a voltage source to apply the additional voltage to the additional laminate layer of the additional thermally regulated structure to adjust a shape of the additional laminate layer such the porosity of the additional thermal fabric provides an emissivity of the additional thermally regulated structure to thermally radiate heat from the additional thermally regulated structure. Detecting the additional temperature at the particular location of the additional thermally regulated structure further includes detecting the additional temperature at the particular portion of the additional thermally regulated structure positioned on a fourth surface of a second body of the information handling system, the fourth surface positioned opposite to a third surface that includes an additional display, the first body coupled to the second body by a hinging apparatus. The thermal fabric layer includes a carbon nanotube-based fabric.

Innovative aspects of the subject matter described in this specification may be embodied in a thermally regulated apparatus, comprising: a thermally regulated structure, including: a thermal fabric layer, the thermal fabric layer having a porosity; a laminate layer coupled to the thermal fabric layer, wherein a shape of the laminate layer controls the porosity of the thermal fabric layer; and a thermal management controller in communication with the thermally regulated structure and configured to adjust the shape of the laminate layer, wherein the thermal management controller adjusts the shape of the laminate layer such the porosity of the thermal fabric provides an emissivity of the thermally regulated structure to thermally radiate heat from the thermally regulated structure.

These and other embodiments may each optionally include one or more of the following features. For instance, the thermally regulated structure further includes a knitted layer and an interface layer, the interface layer positioned between the knitted layer and the laminate layer. The thermal fabric layer includes a carbon nanotube-based fabric.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses systems and methods for controlling a thermally regulated structure of an information handling system. Specifically, in some cases, the information handling system may be absent an internal cooling mechanism, such as a fan. Thus, adequate cooling of the information handling system may not be provided by a fan. To provide further cooling to the information handling system, a thermally regulated structure can be utilized. The thermally regulated structure can be deformed (a material of the thermally regulated structure can be deformed) to adjust a temperature at the information handling system. In some examples, by deforming the thermally regulated structure, the temperature of the information handling system can be cooled by 1 or 2 degrees.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
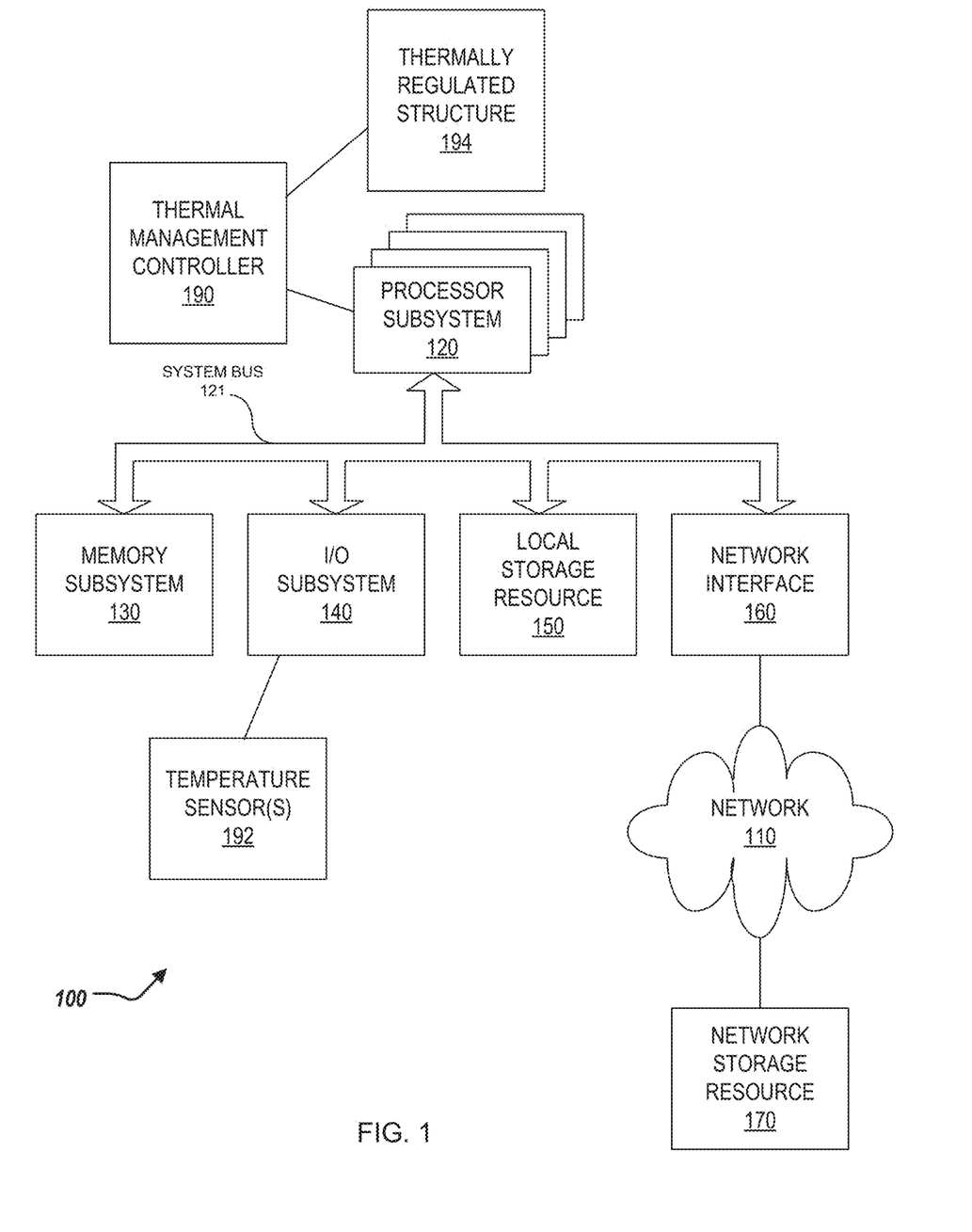
FIG. 1 illustrates a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can include a thermal management controller 190. For example, the thermal management controller 190 can be included by the processor subsystem 120, and/or in communication with the processor subsystem 120. The thermal management controller 190 can adjust a shape of a thermally regulated structure 194 to adjust a temperature at the information handling system 100. Specifically, the thermally regulated structure 194 can include a laminate layer that, in response to a voltage, can adjust its shape. When the laminate layer adjusts its shape, a thermal fabric layer that is in contact with the laminate layer can change its porosity. For example, the porosity of the thermal fabric layer can be increased based on the changed shape of the laminate layer. When the porosity of the thermal fabric layer is increased, the emissivity of the thermally regulated structure 194 is increased to result in an increase of thermal radiation from the thermally regulated structure 194 to lower the temperature of the information handling system 100, described further herein.

The thermal management controller 190 is described further herein. The information handling system 100 can further include a temperature sensor 192 (or temperature sensors 192). For example, the temperature sensor 192 can be included by the I/O subsystem 140, and/or in communication with the I/O subsystem 140. The temperature sensor 192 is described further herein.

Figure 2:
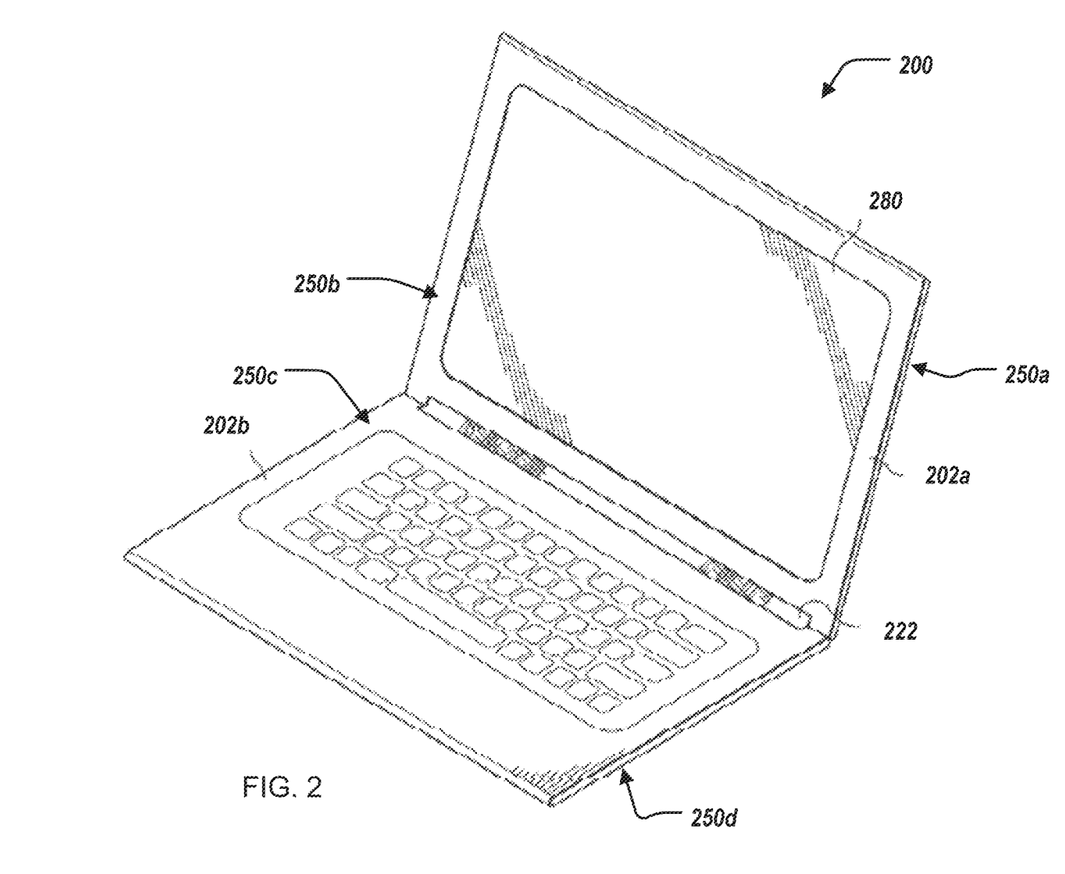
FIG. 2 illustrates a perspective of the information handling system.

FIG. 2 illustrates a dual-body (or two-body) hinged information handling system 200, similar to the information handling system 100 of FIG. 1. The dual-body information handling system 200 can include a first body 202a and a second body 202b (collectively referred to as bodies 202) connected by a hinging apparatus 222. In some examples, the first body 202a can include a display 280 and the second body 202b can include a keyboard, and also include processing components such as the processor subsystem 120 and the thermal management controller 190. In some examples, the second body 202b can further include a display (not shown). In some examples, each of the bodies 202 can include a display.

Figure 3:
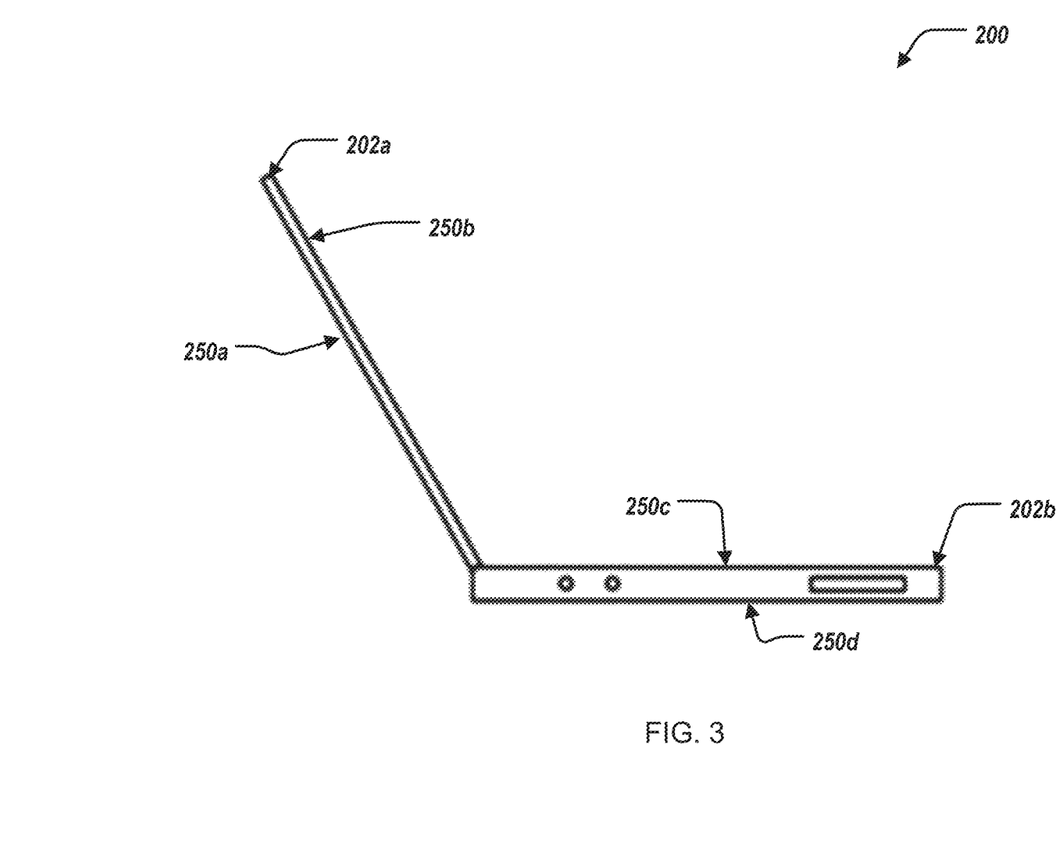
FIG. 3 illustrates a side view of the information handling system.

FIG. 3 illustrates a side view of the information handling system 200. As shown in FIG. 3, the first body 202a can include a first (back) surface 250a ("A cover") positioned opposite to a second (front) surface 250b ("B cover"). The second body 202b can include a third (front) surface 250c ("C cover") positioned opposite to a fourth (back) surface 250d ("D cover"). The surfaces 250a, 250b, 250c, 250d can collectively be referred to as surfaces 250. The second surface 250b can include the display 280; and the third surface 250c can include a display (not shown).

Figure 4:
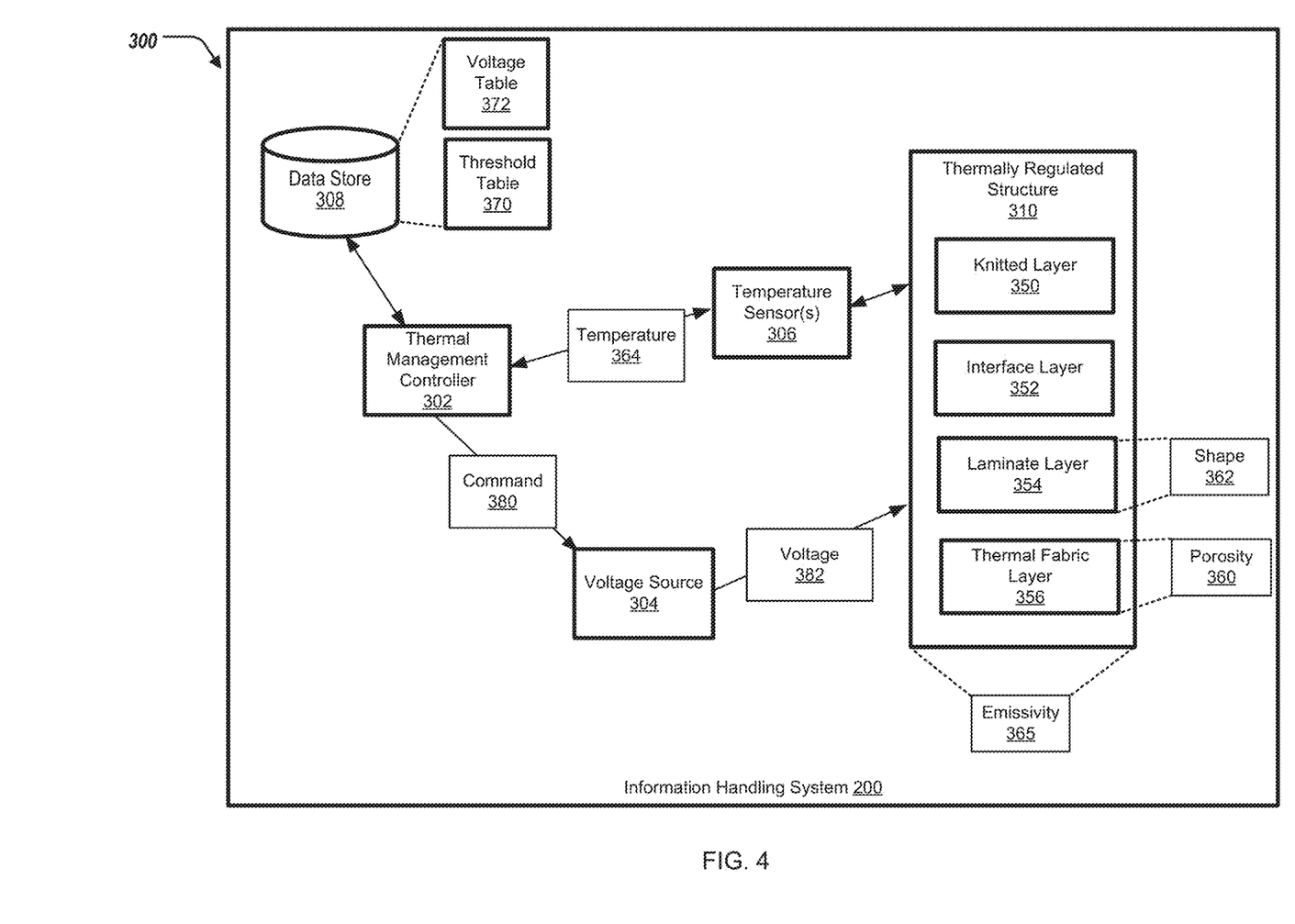
FIG. 4 illustrates a block diagram of the information handling system for controlling a thermally regulated structure.

Turning to FIG. 4, FIG. 4 illustrates a computing environment 300 including the information handling system 200. The information handling system 200 can include a thermal management controller 302, a voltage source 304, temperature sensor(s) 306, a data store 308, and a thermally regulated structure 310. The thermal management controller 302 can be in communication with the voltage source 304, the temperatures sensor 306, and the data store 308. The voltage source 304 can further be in communication with the thermally regulated structure 310. The temperature sensor 306 can further be in communication with the thermally regulated structure 310. The thermal management controller 302 can be the same, or substantially similar to the thermal management controller 190 of FIG. 1. The temperature sensor 306 can be the same, or substantially similar to, the temperature sensors 192 of FIG. 1. The thermally regulated structure 310 can be the same, or substantially similar to, the thermally regulated structure 194 of FIG. 1.

In some cases, the information handling system 200 may be absent an internal cooling mechanism, such as a fan. For example, the information handling system 200 may have limited space for a fan. Thus, adequate cooling of the information handling system 200 may not be provided by a fan. To provide further cooling, the thermally regulated structure 310 can be utilized. Specifically, the thermally regulated structure 310 can be deformed as a user is using the information handling system 200 (a material of the thermally regulated structure 310 can be deformed) to adjust a temperature at the information handling system 200. That is, as the temperature of the information handling system 200 is increased (e.g., above a threshold), the thermally regulated structure 310 can be deformed (in real-time) to increase a thermal radiation at the thermally regulated structure 310, thus lowering the temperature of the information handling system 100, described further herein.

In some examples, by deforming the thermally regulated structure 310, the temperature of the information handling system 200 can be cooled by 1 or 2 degrees. In short, by deforming the thermally regulated structure 310, a shape of thermally regulated structure 310 can be adjusted to include a larger surface area, that thus increase the cooling ability at particular locations of the information handling system 200. The larger surface area of the thermally regulated structure 310 can adjust (increase) the emissivity of the thermally regulated structure 310 to adjust the rate of heat transfer from the information handling system 200 (e.g., a thermal valve).

Figure 5:
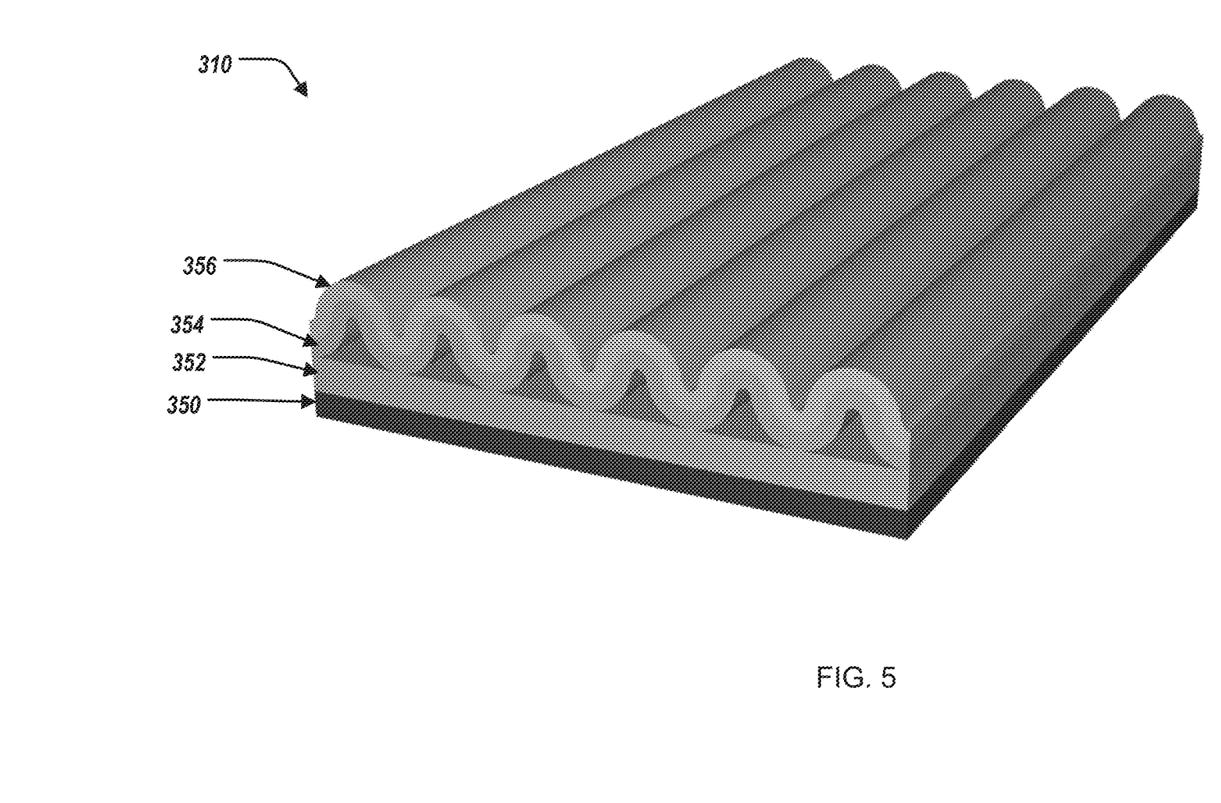
FIG. 5 illustrates a perspective view of the thermally regulated structure.

As illustrated FIGS. 4 and 5, the thermally regulated structure 310 can include a knitted layer 350, an interface layer 352, a laminate layer 354, and a thermal fabric layer 356. In short, the laminate layer 354 can change its shape in response to a voltage. In turn, as the thermal fabric layer 356 is coupled to the laminate layer 354, the laminate layer 354 changes the shape of the thermal fabric layer 356. When the shape of the thermal fabric layer 356 is changed, a porosity of the thermal fabric layer 356 is changed (increased). When the porosity of the thermal fabric layer 356 is changed, an emissivity of the thermally regulated structure 310 is changed (increased), leading to an increase in thermal radiation at the thermally regulated structure 310. The knitted layer 350 is an outside layer that is visible to a user of the information handling system 200 (aesthetic layer) and the interface layer 352 provides an interface between the laminate layer 354 and the knitted layer 350.

Specifically, the interface layer 352 can be positioned between the knitted layer 350 and the laminate layer 354; and the laminate layer 354 can be positioned between the interface layer 352 and the thermal fabric layer 356. The thermal fabric layer 356 can be associated with a parameter of a porosity 360. The porosity 360 can be defined as a ratio of the nonsolid volume (voids) to a total volume of the thermal fabric layer 356 In some examples, the thermal fabric layer 356 can be a piezo thermal fabric layer 356. In some examples, the thermal fabric layer 356 includes a carbon nanotube-based fabric. The laminate layer 354 can be coupled to the thermal fabric layer 356. A shape 362 of the laminate layer 354 can control the porosity 360 of the thermal fabric layer 356, described further herein. The interface layer 352 provides a matching material to the knitted layer 350 to interface with the laminate layer 354. The knitted layer 350 is an aesthetic layer that visible to a user of the information handling system 200.

In some example, the thermally regulated structure 310 is positioned at one or more locations of the information handling system 200. For example, the thermally regulated structure 310 can be positioned at surfaces 250a, 250b of the first body 202a; or the surfaces 250c, 250d of the second body 202b. In some examples, the thermally regulated structure 310 can be positioned on two or more the surfaces 250. For example, a first thermally regulated structure 310 can be positioned at the first surface 250a on the first body 202a and a second thermally regulated structure 310 can be positioned at the fourth surface 250d of the second body 202d. In some examples, multiple thermally regulated structures 310 can be positioned on any combination of the surfaces 250, including each of the surfaces 250. In some examples, the surface 250 can include multiple thermally regulated structures 310 positioned about the surface 250. For example, the first surface 250a of the first body 202a can include multiple thermally regulated structures 310. For example, the first surface 250a of the first body 202a and the fourth surface 252d of the second body 202b can each include multiple thermally regulated structures 310.

In some examples, each of the surfaces 250 can be associated with a heat map identifying particular locations of the surface 250 that are historically associated with higher temperatures compared to the temperatures at other locations of the surface 250. To that end, the thermally regulated structure 310 can be positioned on the respective surface 250 based on the heat map, and in particular, positioned on the respective surface 250 having a historical higher temperature compared to other positions of the respective surface 250.

In some examples, the thermally regulated structure 310 can be positioned at the surface 250 such that the knitted layer 350 is outwards facing (e.g., facing the user of the information handling system 200) and the thermal fabric layer 356 is inwards facing (e.g., facing the internal components of the information handling system 200).

Referring back to FIG. 3, the temperature sensor 306 can be configured to detect a temperature 364 at a particular location of the information handling system 200 that is associated with the thermally regulated structure 310. In some examples, the particular location is physically proximate to the thermally regulated structure 310. In some examples, the particular location is on a surface 250 that differs from the surface 250 that includes the thermally regulated structure 310. In some examples, the temperature sensor 306 can detect the temperature 364 at one of the surfaces 250 that includes the thermally regulated structure 310. For example, when the thermally regulated structure 310 is positioned at the first surface 250a, the temperature sensor 306 can detect the temperature 364 at one or more locations of the first surface 250a. The temperature sensor 306 can detect the temperature 364 at two or more of the surfaces 250. For example, the temperature sensor 306 can detect the temperature 364 at one or more locations of the first surface 250a and the fourth surface 250d. In some examples, the temperature sensor 306 can detect the temperature 364 at the surface 250 at a plurality of locations of the surface 250. In some examples, the temperature sensor 306 detects the temperature 364 at the particular location of surface 250 corresponding to the heat map that indicates the historical higher temperature compared to other locations of the respective surface 250.

The thermal management controller 302 is configured to compare the temperature 364 with a threshold temperature. Specifically, the thermal management controller 302 accesses the data store 308, and specifically a threshold table 370 stored by the data store 308. The threshold table 370 includes, for one or more locations on one or more of the surfaces 250, a threshold temperature associated with the particular location of the respective surface 250. The thermal management controller 302 compares, for the particular location of the particular surface 250, the temperature 364 with the corresponding threshold. When the temperature 364 is less than the threshold, no action is taken by the thermal management controller 302.

In some examples, the thermal management controller 302 compares, for the particular location of the particular surface 250, the temperature 364 with the corresponding threshold, and can determine that the temperature 364 is greater than the corresponding threshold. The thermal management controller 302, in response to determining that the temperature 364 is above (or greater) than the threshold, calculates a voltage 382 to apply to the thermally regulated structure 310 based on the temperature 364. Specifically, the thermal management controller 302 accesses the data store 308, and specifically a voltage table 372 stored by the data store 308. The voltage table 372 includes, for one or more temperatures, an associated voltage. That is, for a detected temperature (i.e., at a particular location of a particular surface 250), the voltage table 372 indicates a value of the voltage 382 to apply to the thermally regulated structure 310. Furthermore, the voltage indicated by the voltage table 372 may be positively correlated with the detected temperature. That is, for a higher detected temperature (i.e., at a particular location of a particular surface 250), the voltage table 372 indicates a higher voltage to be applied.

The thermal management controller 302 can provide a command 380 to the voltage source 304 to apply a voltage 382 to the thermally regulated structure 310, and specifically, to the laminate layer 354. When the voltage 382 is applied to the laminate layer 354, the shape 362 of the laminate layer 354 is adjusted in response. That is, when the voltage source 304 applies the voltage 382 to the laminate layer 354, the laminate layer 354 expands, or changes the (physical) shape 362, to align fibers of the laminate layer 354 in response to the voltage 382. That is, fibers of the laminate layer 354 are aligned to change the physical shape 362 of the laminate layer 354. In some examples, when the fibers of the laminate layer 354 are aligned in response to the voltage 382, such alignment of the fibers increases a surface area of the laminate layer 354.

When the laminate layer 354 changes the shape 362 of itself, the laminate layer 354 can in turn change the shape of the thermal fabric layer 356. That is, as the laminate layer 354 is coupled to the thermal fabric layer 356, when the laminate layer 354 changes the shape 362, the shape of the thermal fabric layer 356 is additionally changed. For example, the surface area of the thermal fabric layer 356 can be increased. To that end, when the shape of the thermal fabric layer 356 is adjusted, the porosity 360 of the thermal fabric layer 356 may be adjusted. As described early, the porosity 360 can be defined as a ratio of the nonsolid volume (voids) to a total volume of the thermal fabric layer 356. The porosity 360 can define a physical size of the voids of the thermal fabric layer 356. Thus, as the porosity 360 of the thermal fabric layer 356 is increased, a size of the pores (the porosity 360) is increased.

In short, the porosity 360 of the thermal fabric layer 356 depends on the shape 362 of the laminate layer 354. As the shape 362 of the laminate layer 354 is adjusted based on the voltage 382 to align the fibers of the laminate layer 354, the porosity 360 of the thermal fabric layer 356 is increased. For example, as the surface area of the laminate layer 354 is increased in view of the voltage 382, the porosity 360 of the thermal fabric layer 356 is also increased.

Furthermore, as the porosity 360 of the thermal fabric layer 356 is increased, the emissivity 365 of the thermally regulated structure 310 is adjusted such that the thermally regulated structure 310 increases the thermal radiation of heat from the thermally regulated structure 310. In short, as the porosity 360 of the thermal fabric layer 356 is increased, the ability of the thermally regulated structure 310 to thermally radiate heat is increased. Specifically, as the physical pores of the thermal fabric layer 356 (the porosity 360 of the thermal fabric layer) are increased, an increasing amount of thermal radiation may be able to vent from the information handling system 200 through such pores of the thermal fabric layer 356. An increased size of such pores of the thermal fabric layer 356 leads to an increased area from which heat may escape from the information handling system 200 through thermal radiation. This increased ability to thermally radiate by the thermally regulated structure 310 decreases the temperature of the information handling system 200.

For example, as the temperature at the particular location of the particular surface 250 is increased, the voltage 382 applied to the laminate layer 354 is increased, thus increasing the porosity 360 of the thermal fabric layer 356 to increase the emissivity 365 of the thermally regulated structure 310 to radiate more heat at the particular location of the particular surface 250. By doing so, the temperature at the particular location of the particular surface 250 can decrease by the thermal heat radiation below the corresponding threshold (e.g., over a period of time). As such, the thermally regulated structure 310 can simulate a "valve" at the surface 250 by increasing or decreasing thermal radiation at the particular location of the particular surface 250 based on the current temperature at the particular location of the particular surface 250.

In some example, the thermally regulated structure 310 is positioned at a particular location of the first surface 250a of the first body 202a. The temperature sensor 306 detects the temperature 364 at the particular location of the first surface 250a of the first body 202a. The thermal management controller 302 receives the temperature 364 from the temperature sensor 306. The thermal management control 302 compares the temperature 364 at the particular location of the surface 250a of the first body 202a to a corresponding threshold (as indicated by the threshold table 370 stored by the data store 308). The thermal management controller 302 determines that the temperature 364 at the particular location of the first surface 250a of the first body 202a is greater than the corresponding threshold. The thermal management controller 302, in response to determining that the temperature 364 at the particular location of the first surface 250a of the first body 202a is greater than the corresponding threshold, calculates the voltage 382 to apply to the thermally regulated structure 310 based on the temperature 364 at the particular location of the first surface 250a of the first body 202a. The thermal management controller 302 provides the command 380 to the voltage source 304 to apply the voltage 382 to the laminate layer 354 of the thermally regulated structure 310. The laminate layer 354, in response to the voltage 382, adjust the shape 362 to increase the porosity 360 of the thermal fabric layer 456 to provides an emissivity of the thermally regulated structure 310 to thermally radiate heat from the thermally regulated structure 310.

In some cases, an additional thermally regulated structure 310 is also positioned at a particular location of the fourth surface 250d of the second body 202d (in addition to the thermally regulated structure 310 is positioned at the particular location of the surface 250a of the first body 202a). The temperature sensor 306 detects the temperature 364 at the particular location of the first surface 250d of the second body 202b. The thermal management controller 302 receives the temperature 364 from the temperature sensor 306. The thermal management control 302 compares the temperature 364 at the particular location of the fourth surface 250d of the second body 202d to a corresponding threshold (as indicated by the threshold table 370 stored by the data store 308). The thermal management controller 302 determines that the temperature 364 at the particular location of the fourth surface 250d of the second body 202b is greater than the corresponding threshold. The thermal management controller 302, in response to determining that the temperature 364 at the particular location of the fourth surface 250d of the second body 202b is greater than the corresponding threshold, calculates the voltage 382 to apply to the thermally regulated structure 310 based on the temperature 364 at the particular location of the fourth surface 250d of the second body 202b. The thermal management controller 302 provides the command 380 to the voltage source 304 to apply the voltage 382 to the laminate layer 354 of the additional thermally regulated structure 310. The laminate layer 354, in response to the voltage 382, adjust the shape 362 to increase the porosity 360 of the thermal fabric layer 356 to provides an emissivity of the additional thermally regulated structure 310 to thermally radiate heat from the additional thermally regulated structure 310.

In an use case example, the information handling system 200 is in table top mode—that is, the information handling system 200 is sitting on a surface such that the fourth surface 250d of the second body 202b is adjacent the surface. When the information handling system 200 is in table top mode, one or more thermally regulated structures 310 that are positioned at the first surface 250a of the first body 202a can be thermally regulated by the thermal management controller 302 as described herein such that the emissivity 365 of the thermally regulated structures 310 positioned at the first surface 250a of the first body 202a are increased to decrease the temperature of the information handling system 200.

In an use case example, the information handling system 200 is in tent mode—that is, the first surface 252a and the fourth surface 252d are proximate to (facing) one another. When the information handling system 200 is in tent mode, one or more thermally regulated structures 310 that are positioned at the second surface 250b of the first body 202a and/or the third surface 240c of the second body 202b can be thermally regulated by the thermal management controller 302 as described herein such that the emissivity 365 of the thermally regulated structures 310 positioned at the second surface 250b of the first body 202a and/or the third surface 240c of the second body 202b are increased to decrease the temperature of the information handling system 200.

Figure 6:
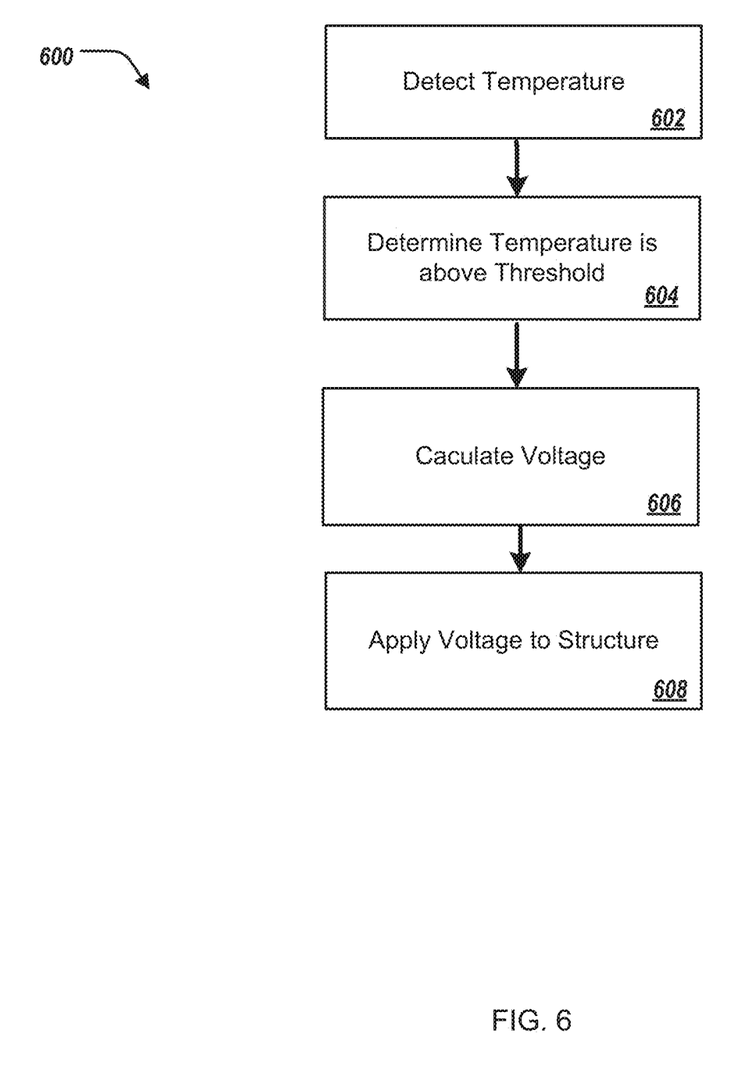
FIG. 6 illustrates a method for controlling the thermally regulated structure.

FIG. 6 illustrates a flowchart depicting selected elements of an embodiment of a method 600 for controlling the thermally regulated structure 310. The method 600 may be performed by the information handling system 100, the information handling system 200, and/or the thermal management controller 302 with reference to FIGS. 1-5. It is noted that certain operations described in method 600 may be optional or may be rearranged in different embodiments.

The temperature sensor 306 detects a first temperature 364 at a particular location of the information handling system 200 associated with the thermally regulated structure 310 (602). For example, the particular location can be any location of any of the surfaces 250 of the bodies 202 of the information handling system 200. The thermal management controller 302 determines that the first temperature 364 is above a threshold (604). The thermal management controller 302, in response to determining that the first temperature 364 is above the threshold, calculates the voltage 382 to apply to the thermally regulated structure 310 (606). The thermal management controller 302 provides the command 380 to the voltage source 304 to apply the voltage 382 to the laminate layer 354 of the thermally regulated structure 310 such that the porosity 360 of the thermal fabric layer 356 provides the emissivity 365 of the thermally regulated structure 310 to thermally radiate heat from the thermally regulated structure 310 (608).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
    a voltage source;
    a thermally regulated structure, including:
        a thermal fabric layer, the thermal fabric layer having a porosity;
        a laminate layer coupled to the thermal fabric layer, wherein a shape of the laminate layer controls the porosity of the thermal fabric layer;
    a memory media storing instructions;
    a thermal management controller in communication with the memory media to execute the instructions to perform operations comprising:
        determining that a first temperature at a particular location of the information handling system associated with the thermally regulated structure is above a threshold;
        in response to determining that the first temperature is above the threshold, calculating a voltage to apply to the thermally regulated structure based on the first temperature; and
        providing a command to the voltage source to apply the voltage to the laminate layer of the thermally regulated structure to adjust a shape of the laminate layer such the porosity of the thermal fabric provides an emissivity of the thermally regulated structure to thermally radiate heat from the thermally regulated structure.

2. The information handling system of claim 1, wherein the thermally regulated structure further includes a knitted layer and an interface layer, the interface layer positioned between the knitted layer and the laminate layer.

3. The information handling system of claim 1, wherein the information handling system includes a first body and a second body, the first body coupled to the second body by a hinging apparatus, the first body including a first surface and a second surface positioned opposite to the first surface, the second surface of the first body including a display, wherein the thermally regulated structure is positioned on the first surface of the first body.

4. The information handling system of claim 3, further comprising:
    an additional thermally regulated structure, including:
        an additional thermal fabric layer, the thermal fabric layer having a porosity; and
        an additional laminate layer coupled to the additional thermal fabric layer, wherein a shape of the additional laminate layer controls the porosity of the additional thermal fabric layer.

5. The information handling system of claim 4, wherein the thermal management controller is further configured to:
    determine that an additional temperature at a particular location of the information handling system associated with the additional thermally regulated structure is above an additional threshold;
    in response to determining that the additional temperature is above the additional threshold, calculating an additional voltage to apply to the additional thermally regulated structure based on the additional temperature; and
    providing an additional command to the voltage source to apply the additional voltage to the laminate layer of the additional thermally regulated structure to adjust a shape of the additional laminate layer such the porosity of the additional thermal fabric layer provides an emissivity of the additional thermally regulated structure to thermally radiate heat from the additional thermally regulated structure.

6. The information handling system of claim 5, wherein the second body includes a third surface and a fourth surface positioned opposite to the third surface, the third surface including an additional display, wherein the additional thermally regulated structure is positioned on the fourth surface of the second body.

7. The information handling system of claim 1, wherein the thermal fabric layer includes a carbon nanotube-based fabric.

8. A method of controlling a thermally regulated structure of an information handling system, including:
    detecting a first temperature at a particular location of the information handling system associated with the thermally regulated structure, the thermally regulated structure including i) a thermal fabric layer having a porosity and ii) a laminate layer coupled to the thermal fabric layer having a shape that controls the porosity of the thermal fabric layer;
    determining that the first temperature is above a threshold;
    in response to determining that the first temperature is above the threshold:
        calculating a voltage to apply to the thermally regulated structure based on the first temperature; and
        providing a command to a voltage source to apply the voltage to the laminate layer of the thermally regulated structure to adjust a shape of the laminate layer such the porosity of the thermal fabric layer provides an emissivity of the thermally regulated structure to thermally radiate heat from the thermally regulated structure.

9. The method of claim 8, wherein detecting the first temperature at the particular location of the thermally regulated structure further includes detecting the first temperature at the particular portion of the thermally regulated structure positioned on a first surface of a first body of the information handling system, the first surface positioned opposite to a second surface that includes a display.

10. The method of claim 9, further comprising:
    detecting an additional temperature at a particular location of the information handling system associated with an additional thermally regulated structure, the additional thermally regulated structure including i) an additional thermal fabric layer having a porosity and ii) an additional laminate layer coupled to the additional thermal fabric layer having a shape that controls the porosity of the additional thermal fabric layer;
    determining that the additional temperature is above an additional threshold;
    in response to determining that the additional temperature is above the additional threshold:
        calculating an additional voltage to apply to the additional thermally regulated structure based on the additional temperature; and
        providing a command to a voltage source to apply the additional voltage to the additional laminate layer of the additional thermally regulated structure to adjust a shape of the additional laminate layer such the porosity of the additional thermal fabric provides an emissivity of the additional thermally regulated structure to thermally radiate heat from the additional thermally regulated structure.

11. The method of claim 10, wherein detecting the additional temperature at the particular location of the additional thermally regulated structure further includes detecting the additional temperature at the particular portion of the additional thermally regulated structure positioned on a fourth surface of a second body of the information handling system, the fourth surface positioned opposite to a third surface that includes an additional display, the first body coupled to the second body by a hinging apparatus.

12. The method handling system of claim 8, wherein the thermal fabric layer includes a carbon nanotube-based fabric.

13. A thermally regulated apparatus, comprising:
    a thermally regulated structure, including:
        a thermal fabric layer, the thermal fabric layer having a porosity;
        a laminate layer coupled to the thermal fabric layer, wherein a shape of the laminate layer controls the porosity of the thermal fabric layer; and
    a thermal management controller in communication with the thermally regulated structure and configured to adjust the shape of the laminate layer, wherein the thermal management controller adjusts the shape of the laminate layer such the porosity of the thermal fabric provides an emissivity of the thermally regulated structure to thermally radiate heat from the thermally regulated structure.

14. The thermally regulated apparatus of claim 13, wherein the thermally regulated structure further includes a knitted layer and an interface layer, the interface layer positioned between the knitted layer and the laminate layer.

15. The thermally regulated apparatus of claim 13, wherein the thermal fabric layer includes a carbon nanotube-based fabric.

* * * * *